United States Patent
Dent

(10) Patent No.: US 6,229,796 B1
(45) Date of Patent: May 8, 2001

(54) CODE-REUSE PARTITIONING SYSTEMS AND METHODS FOR CELLULAR RADIOTELEPHONE SYSTEMS

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/186,575

(22) Filed: Nov. 5, 1998

Related U.S. Application Data

(62) Division of application No. 08/608,717, filed on Feb. 29, 1996, now Pat. No. 5,844,894.

(51) Int. Cl.[7] .............................. H04B 7/216; H04J 13/02
(52) U.S. Cl. ......................... 370/335; 370/342; 370/350; 375/145
(58) Field of Search .................................. 370/329, 330, 370/335, 337, 342, 347, 350, 465, 503; 375/365, 366, 130, 131, 140, 141, 145

(56) References Cited

U.S. PATENT DOCUMENTS

| | | | |
|---|---|---|---|
| 4,866,710 | 9/1989 | Schaeffer | 370/330 |
| 5,038,399 | 8/1991 | Bruckert | 455/447 |
| 5,170,412 | * 12/1992 | Massey | 370/342 |
| 5,185,739 | 2/1993 | Spear | 370/337 |

(List continued on next page.)

FOREIGN PATENT DOCUMENTS

| | | |
|---|---|---|
| 0 444 841 A2 | 2/1991 | (EP) . |
| 0 578 506 A2 | 1/1994 | (EP) . |
| 0 593 209 A1 | 4/1994 | (EP) . |
| 0 701 337 A2 | 3/1996 | (EP) . |
| 2 285 900 | 7/1995 | (GB) . |
| WO 91/13521 | 9/1991 | (WO) . |
| WO 94/05096 | 3/1994 | (WO) . |
| WO 94/27384 | 11/1994 | (WO) . |
| WO 94/28643 | 12/1994 | (WO) . |

OTHER PUBLICATIONS

Lee, William C.Y., *Modulation Technology, Mobile Communications Engineering*, Ch. 8, pp. 235–272 (McGraw–Hill Book Company, 1982).

PCT Search Report, PCT/US97/02857, Aug. 28, 1997.

Sanada et al., *A Transmission Power Control Technique on a TDD–DCMA/TDMA System for Wireless Multimedia Networks*, IEICE Transactions on Communications, vol. E78–B, No. 8, pp. 1095–1103 (Aug. 1995).

*Primary Examiner*—Alpus H. Hsu
(74) *Attorney, Agent, or Firm*—Myers Bigel Sibley & Sajovec

(57) ABSTRACT

Time slots of a plurality of time-division multiple access (TDMA) cellular radiotelephone base stations are synchronized. Cellular radiotelephone frequencies are allocated among the plurality of base stations according to a first frequency allocation system in a first synchronized time slot and according to a second frequency allocation system in a second synchronized time slot. Each frequency allocation system may include an adaptive channel allocation system, a frequency reuse system, a frequency reuse partitioning system or a fixed frequency reuse system. Spreading codes of a plurality of code-division multiple access (CDMA) cellular radiotelephone base stations are synchronized. Cellular radiotelephone frequencies are allocated among the plurality of base stations according to a first frequency allocation system for a first synchronized spreading code and according to a second frequency allocation system for a second synchronized spreading code. Each frequency allocation system may include an adaptive channel allocation system, a frequency reuse system, a frequency reuse partitioning system or a fixed frequency reuse system. Cellular radiotelephone systems and methods affording increased base station channel capacity, more efficient spectrum utilization and improved equipment migration are thus provided.

7 Claims, 9 Drawing Sheets

U.S. PATENT DOCUMENTS

| | | | |
|---|---|---|---|
| 5,230,082 | 7/1993 | Ghisler et al. | 455/450 |
| 5,260,944 | 11/1993 | Tomabechi | 370/350 |
| 5,278,835 | 1/1994 | Ito et al. | 370/332 |
| 5,293,423 | 3/1994 | Dahlin et al. | 380/48 |
| 5,301,188 | 4/1994 | Kotzin et al. | 370/330 |
| 5,363,376 | 11/1994 | Chuang et al. | 370/332 |
| 5,396,496 | 3/1995 | Ito et al. | 370/350 |
| 5,404,574 | 4/1995 | Benveniste | 455/447 |
| 5,410,588 | 4/1995 | Ito | 455/502 |
| 5,430,731 | 7/1995 | Umemoto et al. | 370/350 |
| 5,430,761 | 7/1995 | Bruckert et al. | 375/200 |
| 5,437,056 | 7/1995 | Rautiola | 455/452 |
| 5,481,533 * | 1/1996 | Honig et al. | 370/335 |
| 5,594,720 | 1/1997 | Papadopoulos et al. | 370/337 |
| 5,619,503 * | 4/1997 | Dent | 370/330 |
| 5,640,385 * | 6/1997 | Long et al. | 370/335 |
| 5,732,076 * | 3/1998 | Ketseglou et al. | 370/347 |
| 5,850,392 * | 12/1998 | Wang et al. | 370/335 |
| 5,859,841 * | 1/1999 | Gitlits | 370/335 |
| 6,018,528 * | 1/2000 | Gitlin et al. | 370/436 |

\* cited by examiner

| CELL | TIME SLOT $T_1$ | TIME SLOT $T_2$ | TIME SLOT $T_n$ |
|---|---|---|---|
| 1 | $f_1, f_2, f_3, f_4, f_5, f_6, f_7$ | $f_1$ | $f_1, f_2, f_3$ |
| 2 | $f_8, f_9, f_{10}, f_{11}, f_{12}, f_{13}, f_{14}$ | $f_2$ | $f_4, f_5, f_6$ |
| 3 | $f_1, f_2, f_3, f_4, f_5, f_6, f_7$ | $f_3$ | $f_7, f_8, f_9$ |
| 4 | $f_8, f_9, f_{10}, f_{11}, f_{12}, f_{13}, f_{14}$ | $f_4$ | $f_{10}, f_{11}, f_{12}$ |
| 5 | $f_1, f_2, f_3, f_4, f_5, f_6, f_7$ | $f_5$ | $f_{13}, f_{14}, f_{15}$ |
| 6 | $f_8, f_9, f_{10}, f_{11}, f_{12}, f_{13}, f_{14}$ | $f_6$ | $f_{16}, f_{17}, f_{18}$ |
| 7 | $f_{15}, f_{16}, f_{17}, f_{18}, f_{19}, f_{20}, f_{21}$ | $f_7$ | $f_{19}, f_{20}, f_{21}$ |
| 8 | $f_{15}, f_{16}, f_{17}, f_{18}, f_{19}, f_{20}, f_{21}$ | $f_8$ | $f_1, f_2, f_3$ |
| 9 | $f_1, f_2, f_3, f_4, f_5, f_6, f_7$ | $f_9$ | $f_4, f_5, f_6$ |
| 10 | $f_{15}, f_{16}, f_{17}, f_{18}, f_{19}, f_{20}, f_{21}$ | $f_{10}$ | $f_7, f_8, f_9$ |
| 11 | $f_1, f_2, f_3, f_4, f_5, f_6, f_7$ | $f_{11}$ | $f_{10}, f_{11}, f_{12}$ |
| 12 | $f_{15}, f_{16}, f_{17}, f_{18}, f_{19}, f_{20}, f_{21}$ | $f_{12}$ | $f_{13}, f_{14}, f_{15}$ |
| 13 | $f_1, f_2, f_3, f_4, f_5, f_6, f_7$ | $f_{13}$ | $f_{16}, f_{17}, f_{18}$ |
| 14 | $f_8, f_9, f_{10}, f_{11}, f_{12}, f_{13}, f_{14}$ | $f_{14}$ | $f_{19}, f_{20}, f_{21}$ |
| 15 | $f_8, f_9, f_{10}, f_{11}, f_{12}, f_{13}, f_{14}$ | $f_{15}$ | $f_1, f_2, f_3$ |
| 16 | $f_{15}, f_{16}, f_{17}, f_{18}, f_{19}, f_{20}, f_{21}$ | $f_{16}$ | $f_4, f_5, f_6$ |
| 17 | $f_8, f_9, f_{10}, f_{11}, f_{12}, f_{13}, f_{14}$ | $f_{17}$ | $f_7, f_8, f_9$ |
| 18 | $f_{15}, f_{16}, f_{17}, f_{18}, f_{19}, f_{20}, f_{21}$ | $f_{18}$ | $f_{10}, f_{11}, f_{12}$ |
| 19 | $f_8, f_9, f_{10}, f_{11}, f_{12}, f_{13}, f_{14}$ | $f_{19}$ | $f_{13}, f_{14}, f_{15}$ |
| 20 | $f_{15}, f_{16}, f_{17}, f_{18}, f_{19}, f_{20}, f_{21}$ | $f_{20}$ | $f_{16}, f_{17}, f_{18}$ |
| 21 | $f_1, f_2, f_3, f_4, f_5, f_6, f_7$ | $f_{21}$ | $f_{19}, f_{20}, f_{21}$ |

FIG. 5B.

| CELL | CODE $C_1$ | CODE $C_2$ | CODE $C_3$ |
|---|---|---|---|
| 1 | $f_1, f_2, f_3$ | $f_1$ | $f_1, f_2, f_3$ |
| 2 | $f_4, f_5, f_6$ | $f_2$ | $f_4, f_5, f_6$ |
| 3 | $f_7, f_8, f_9$ | $f_3$ | $f_7, f_8, f_9$ |
| 4 | $f_{10}, f_{11}, f_{12}$ | $f_4$ | $f_{10}, f_{11}, f_{12}$ |
| 5 | $f_{13}, f_{14}, f_{15}$ | $f_5$ | $f_{13}, f_{14}, f_{15}$ |
| 6 | $f_{16}, f_{17}, f_{18}$ | $f_6$ | $f_{16}, f_{17}, f_{18}$ |
| 7 | $f_{19}, f_{20}, f_{21}$ | $f_7$ | $f_{19}, f_{20}, f_{21}$ |
| 8 | $f_1, f_2, f_3$ | $f_8$ | $f_1, f_2, f_3$ |
| 9 | $f_4, f_5, f_6$ | $f_9$ | $f_4, f_5, f_6$ |
| 10 | $f_7, f_8, f_9$ | $f_{10}$ | $f_7, f_8, f_9$ |
| 11 | $f_{10}, f_{11}, f_{12}$ | $f_{11}$ | $f_{10}, f_{11}, f_{12}$ |
| 12 | $f_{13}, f_{14}, f_{15}$ | $f_{12}$ | $f_{13}, f_{14}, f_{15}$ |
| 13 | $f_{16}, f_{17}, f_{18}$ | $f_{13}$ | $f_{16}, f_{17}, f_{18}$ |
| 14 | $f_{19}, f_{20}, f_{21}$ | $f_{14}$ | $f_{19}, f_{20}, f_{21}$ |
| 15 | $f_1, f_2, f_3$ | $f_{15}$ | $f_1, f_2, f_3$ |
| 16 | $f_4, f_5, f_6$ | $f_{16}$ | $f_4, f_5, f_6$ |
| 17 | $f_7, f_8, f_9$ | $f_{17}$ | $f_7, f_8, f_9$ |
| 18 | $f_{10}, f_{11}, f_{12}$ | $f_{18}$ | $f_{10}, f_{11}, f_{12}$ |
| 19 | $f_{13}, f_{14}, f_{15}$ | $f_{19}$ | $f_{13}, f_{14}, f_{15}$ |
| 20 | $f_{16}, f_{17}, f_{18}$ | $f_{20}$ | $f_{16}, f_{17}, f_{18}$ |
| 21 | $f_{19}, f_{20}, f_{21}$ | $f_{21}$ | $f_{19}, f_{20}, f_{21}$ |

FIG. 8B.

CODE-REUSE PARTITIONING SYSTEMS AND METHODS FOR CELLULAR RADIOTELEPHONE SYSTEMS

This is a divisional application of application Ser. No. 08/608,717, filed Feb. 29, 1996, now U.S. Pat. No. 5,844,894.

FIELD OF THE INVENTION

The present invention relates generally to communications systems, more specifically, to cellular radio communications systems and associated methods.

BACKGROUND OF THE INVENTION

Cellular communications systems are commonly employed to provide voice and data communications to a plurality of mobile units or subscribers. Analog cellular systems, such as designated AMPS, ETACS, NMT-450, and NMT-900, have been deployed successfully throughout the world. More recently, digital cellular systems such as designated IS-54B in North America and the pan-European GSM system have been introduced. These systems, and others, are described, for example, in the book titled *Cellular Radio Systems* by Balston, et al., published by Artech House, Norwood, Mass., 1993.

As illustrated in FIG. 1, a cellular communication system 20 as in the prior art includes one or more mobile cellular radiotelephones 21, one or more base stations 23 and a mobile telephone switching office (MTSO) 25. Although only three cells 36 are shown in FIG. 1, a typical cellular network may comprise hundreds of base stations, thousands of cellular radiotelephones and more than one MTSO. Each cell will have allocated to it one or more dedicated control channels and one or more voice channels. A typical cell may have, for example, one control channel, and 21 voice/data, or traffic, channels. The control channel is a dedicated channel used for transmitting cell identification and paging information. The traffic channels carry the voice and data information.

The MTSO 25 is the central coordinating element of the overall cellular network 20. It typically includes a cellular processor 28, a cellular switch 29 and also provides the interface to the public switched telephone network (PSTN) 30. Through the cellular network 20, a duplex radio communication link 32 may be effected between two cellular radiotelephones 21 or, between a cellular radiotelephone 21 and a landline telephone user 33. The function of the base station 23 is commonly to handle the radio communication with the cellular radiotelephone 21. In this capacity, the base station 23 functions chiefly as a relay station for data and voice signals. The base station 23 also supervises the quality of the link 32 and monitors the received signal strength from the cellular radiotelephone 21.

One visible feature of a typical base station 23 is the antenna tower 35. In order to achieve a reasonable coverage area, the antennas 63, 65 are typically mounted at some distance above the ground. Referring now additionally to the prior art schematic plan view illustration of FIG. 2A, in rural areas the towers 35 are commonly located at the center of a cell 36 thereby providing omni-directional coverage. In an omni-directional cell, the control channel(s) and the active voice channel(s) are broadcast in all areas of the cell—usually from a single antenna. Where base stations 23 are more densely located, a sectorized antenna system may be employed as in the prior art, and shown by the schematic diagram of FIG. 2B. Sectorization requires directional antennas 70 having, for example, a 120 degree radiation pattern as illustrated in FIG. 2B. Each sector 71 is itself a cell.

Conventional analog cellular systems generally employ a system referred to as frequency division multiple access (FDMA) to create communications channels. As will be understood by those skilled in the art, cellular radiotelephone systems generally communicate using radiotelephone communications signals communicated over a spectrum of carrier frequencies. As a practical matter, radiotelephone communications signals, being modulated waveforms, typically are communicated over predetermined frequency bands in the spectrum of carrier frequencies. In an FDMA system, "channels" are discrete predetermined frequency bands over which cellular radiotelephones communicate with a cellular base station. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

The limited number of available frequency bands presents several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed in particular cells to handle potentially higher local subscriber densities at any given time. For example, a cell in an urban area might conceivably contain hundreds or thousands of subscribers at any one time, easily exhausting the number of frequencies available in the cell.

For these reasons, conventional cellular systems employ frequency reuse to increase potential channel capacity in each cell and increase spectral efficiency. Frequency reuse involves allocating frequencies to each cell. Cells employing the same frequencies are geographically separated to allow mobile units in different cells to simultaneously use the same frequency without interfering with each other. By so doing, many thousands of subscribers may be served by a system of only several hundred frequency bands.

Time division multiple access (TDMA) systems provide potentially greater channel capacity and spectral efficiency through more efficient allocation of system time resources. A TDMA system may be implemented by subdividing the frequency bands employed in conventional FDMA systems into sequential time slots, so that a TDMA channel comprises a particular frequency and time slot combination. An example of a system employing TDMA is the dual analog/digital IS-54B standard employed in the United States, in which each of the original frequency bands of EIA-553 is subdivided into 3 time slots.

Code division multiple access (CDMA) systems have been proposed as an alternative method of increasing channel capacity and spectral efficiency. CDMA systems employ spread-spectrum techniques previously developed for military communications. Subscribers are assigned one or more unique spreading codes, each of which represent a channel in the CDMA system. In one form of CDMA, transmission involves the direct modulation of a data-modulated carrier frequency signal by a digital spreading code waveform, a technique known as direct-sequence modulation. In another form of CDMA, a data-modulated carrier frequency signal is modulated by a frequency-hopping signal which changes frequency at fixed time intervals according to a spreading code. Yet another form of CDMA represents a combination of these direct-sequence and frequency-hopping techniques. These and other forms of CDMA are described in Chapter 8 of the book entitled "*Mobile Communications Engineering*," by William C. Y. Lee, published by McGraw-Hill, 1992.

The transmitted signal in these CDMA systems is a coded signal which is "spread" away from the original carrier frequency across the frequency spectrum. The coded transmission is recovered, or "despread," by a receiver operating with a matching spreading code. A unique aspect of CDMA is that each subscriber operates across the available spectrum, instead of operating on discrete frequency bands. Thus, CDMA potentially provides for more efficient spectrum utilization and for gradual and uniform degradation of communications quality among all users as system becomes overloaded. CDMA is also theoretically more immune to certain types of narrow-band interference.

The performance of TDMA and CDMA systems is improved by synchronization of time slots or spreading codes among base stations. For example, synchronization eases handoff between cells, allows reduced "guard times" between time slots and reduces interference caused by overlap of TDMA time slots or CDMA spreading codes. Methods for synchronizing base stations are disclosed in U.S. Pat. No. 5,293,423 to Dahlin et al., U.S. Pat. No. 5,363,379 to Chuang et al., U.S. Pat. No. 5,410,588 to Ito, International Application No. PCT/FI93/00228 to Vikamaa (filed May 27, 1993), European Patent Application No. 93307951.9 to Matsuno (filed Jun. 10, 1993), European Patent Application No. 93305417.3 to Hashimoto (filed Sep. 9, 1993) and Japan Patent Application No. 91264432 to Kazuyuki (filed Oct. 14, 1991).

Conventional TDMA cellular systems generally allocate groups of frequencies for each channel according to a fixed frequency reuse plan. The analog AMPS system used in the United States, for example, employs a 21-cell reuse pattern to achieve a desired signal to interfering noise ratio (C/I) of 17–18 dB when the system is fully loaded. This reuse pattern guarantees a minimum separation of approximately $\sqrt{2}$ cell diameters between base stations employing the same group of carrier frequencies. The digital GSM system typically employs a seven- or nine-cell reuse pattern, maintaining comparable signal quality through supplemental digital coding techniques.

Apart from the generally undesirable alternative of increasing the number of frequency bands, other techniques for increasing potential cell channel capacity and spectral efficiency include adaptive allocation of channels between stations and the use of microcell techniques.. Adaptive channel allocation dynamically assigns channels between radiotelephones and base stations based upon loading and other system parameters. For example, Swedish Application No. 9301695-4 to Wallestedt (filed May 17, 1993), discloses the use of an adaptive channel allocation (ACA) algorithm which assigns radiotelephones to base stations according to signal quality, channel availability and other indices. Microcell techniques attack the problems of insufficient local channel capacity and spectral inefficiency by decreasing cell size, thus lowering the probable number of subscribers in a particular cell and allowing more frequency reuse in a given geographical area.

As the number of subscribers using a cellular radiotelephone system increases, there is an ever present need for greater cell channel capacity and more efficient spectrum utilization. The fixed frequency reuse plans of conventional systems such as AMPS and GSM may provide insufficient local channel capacity by assigning the same group of frequencies for all time slots for a given reuse group. These fixed frequency groupings also often result in poor spectrum utilization as demand varies across the cellular radiotelephone system. Although adaptive channel allocation may more efficiently assign existing channels, it generally does not increase the potential number of channels available in a given cell. Microcell techniques may decrease channel demand in each cell, but may not be cost effective for large-scale cellular radiotelephone systems because more base stations may be required.

SUMMARY OF THE INVENTION

In view of the foregoing, it is an object of the present invention to provide cellular radiotelephone systems and methods capable of increased base station channel capacity.

It is another object of the present invention to provide cellular radiotelephone systems and methods capable of more efficient spectrum utilization.

These and other objects, advantages, and features of the present invention are provided by cellular radiotelephone systems and methods that synchronize the time slots of a plurality of time-division multiple access (TDMA) base stations and allocate cellular radiotelephone frequencies among the plurality of TDMA base stations according to a different frequency allocation systems in different TDMA time slots. By using a different frequency allocation among the plurality of base stations in different TDMA time slots, the cellular systems may thereby employ a variety of frequency reuse techniques, each adapted to the traffic occurring in the system.

In particular, a cellular radiotelephone system according to the present invention includes a plurality of TDMA cellular radiotelephone base stations, each which serves a cell and communicates with cellular telephones using radiotelephone signals communicated over a like plurality of sequential time slots. Time-slot synchronizing means are provided for synchronizing these time slots among the plurality of base stations. Time-reuse partitioning means are provided for allocating cellular radiotelephone frequencies among the plurality of base stations according to a first frequency allocation system in a first time slot and according to a second frequency allocation different from the first frequency allocation in a second time slot. For example, the first time slot may use a 21-cell frequency reuse pattern while the second time slot employs another fixed frequency allocation system or an adaptive channel allocation system.

The present invention offers the advantage of increased base station channel capacity by allowing base stations to operate on the same frequencies in different TDMA time slots, while controlling interference between neighboring cells. The present invention also can provide for more efficient spectrum utilization through increased base station channel capacity and flexible reuse planning to compensate for uneven loading among radiotelephone cells. In addition, the present invention allows existing systems to migrate, accommodating both existing subscribers and new subscribers having more advanced equipment which may be compatible with a different frequency allocation system. As subscribers convert to newer equipment, the cellular radiotelephone system may be gradually changed over to be compatible with the new equipment while gradually phasing out provisions for older, less advanced equipment.

The time-slot synchronizing means may include systems which employ a global timing reference, such as that provided by the Global Positioning System (GPS). Each of the frequency allocation systems for a TDMA time slot may include a fixed frequency reuse system or an adaptive channel allocation system for dynamically adjusting the frequency allocation in response to changes in loading or other system parameters. Time-reuse partitioning means may allocate frequencies according to a frequency reuse partitioning system whereby radiotelephone communications signal propagation distance is controlled for each cellular radiotelephone frequency allocated to a base station in a given time slot, thus reducing interference between neighboring base stations operating on the same frequency in the same time slot.

It will be understood by those skilled in the art that similar objects, advantages and features of the present invention are provided by code-division multiple access (CDMA) cellular systems including means for synchronizing the spreading codes of a plurality of code-division multiple access (CDMA) base stations and code-reuse partitioning means for allocating cellular radiotelephone carrier frequencies among the plurality of CDMA base stations for each spreading code. The spreading codes may include direct-sequence modulation codes, frequency-hopping codes, or combined direct-sequence/frequency-hopping codes. Each of the frequency allocation systems for a CDMA spreading code may include a fixed frequency reuse system or an adaptive channel allocation system for dynamically adjusting the frequency allocation in response to changes in loading or other system parameters. In addition, code-reuse partitioning means may allocate frequencies such that the signal range is controlled for each cellular radiotelephone frequency allocated to a base station for each spreading code. Thus a CDMA system with increased channel capacity and spectral efficiency is provided.

A method aspect of the present invention allocates cellular radiotelephone frequencies among a plurality of TDMA cellular radiotelephone base stations according to a first frequency allocation system in a first time slot and according to a second frequency system different from the first frequency allocation system in a second time slot. Another method aspect of the present invention allocates cellular radiotelephone carrier frequencies among a plurality of synchronized CDMA cellular radiotelephone base stations according to a first frequency allocation system for a first spreading code and according to a second frequency system different from the first frequency allocation system for a second spreading code.

BRIEF DESCRIPTION OF THE DRAWINGS

FIG. 5B is a chart illustrating frequency allocation among cells of a time-division multiple access cellular radiotelephone system according to the present invention.

FIG. 8B is a chart illustrating frequency allocation among cells of a code-division multiple access cellular radiotelephone system according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
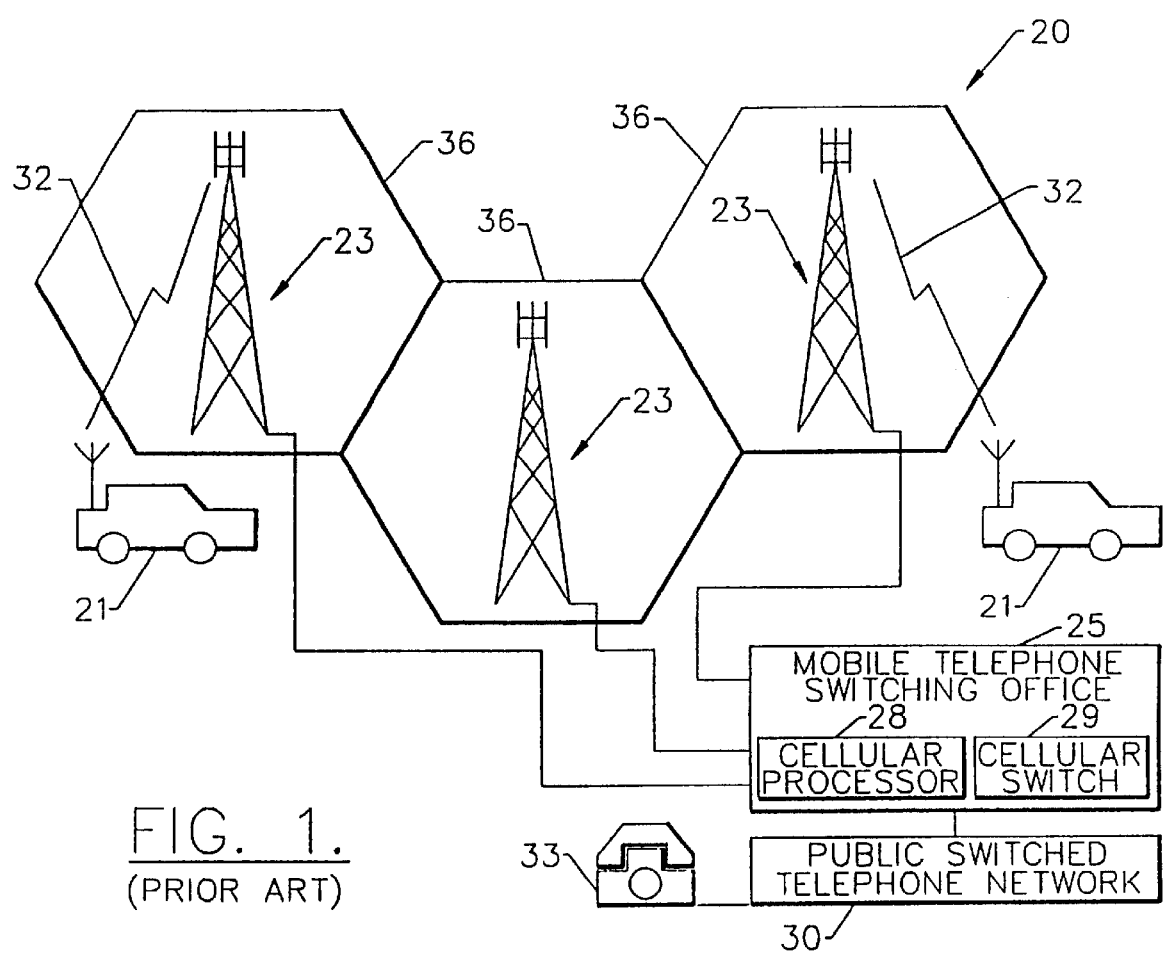
FIG. 1 is a schematic block diagram illustrating a cellular radiotelephone system as in the prior art.
Figure 2A:
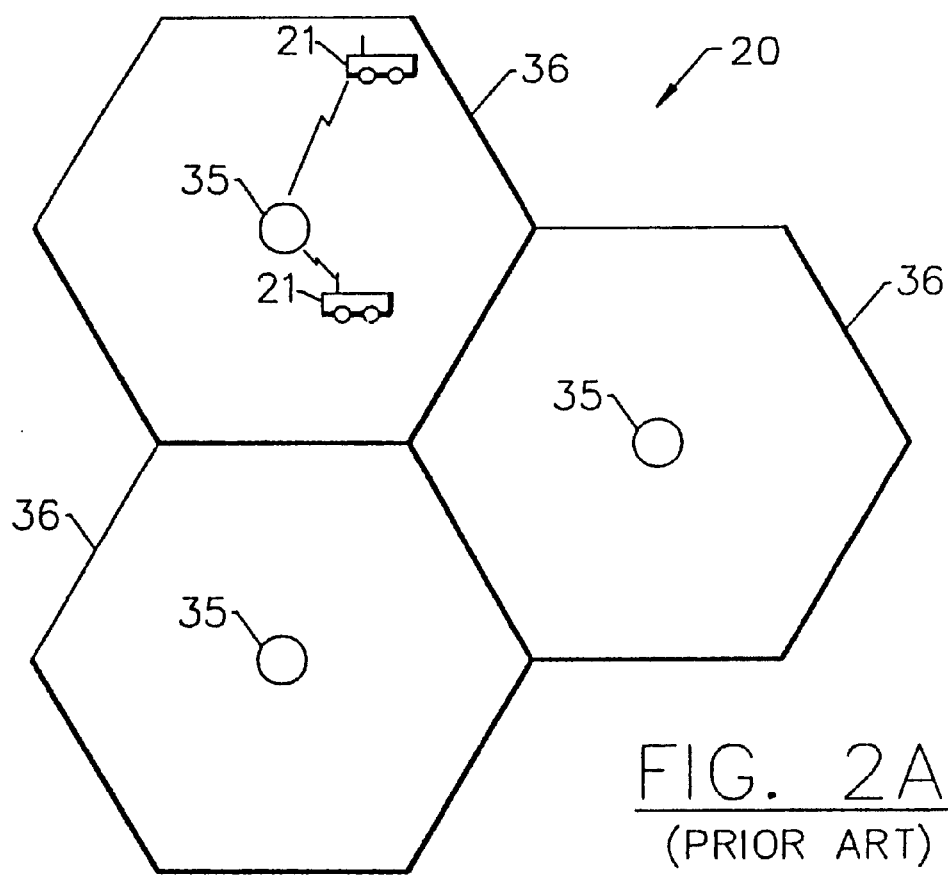
FIG. 2 is a plan view illustrating cells in a radiotelephone system as in the prior art.
Figure 2B:
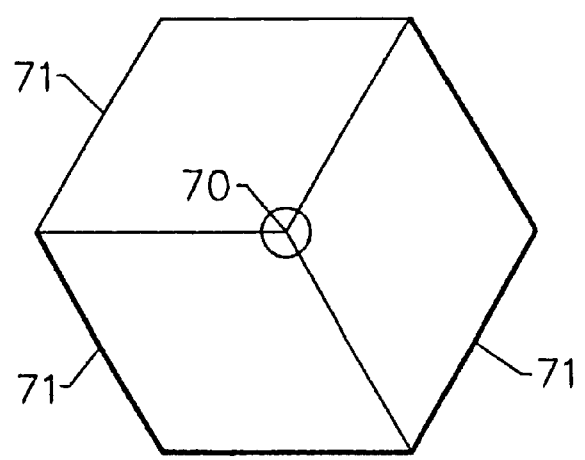
Figure 3:
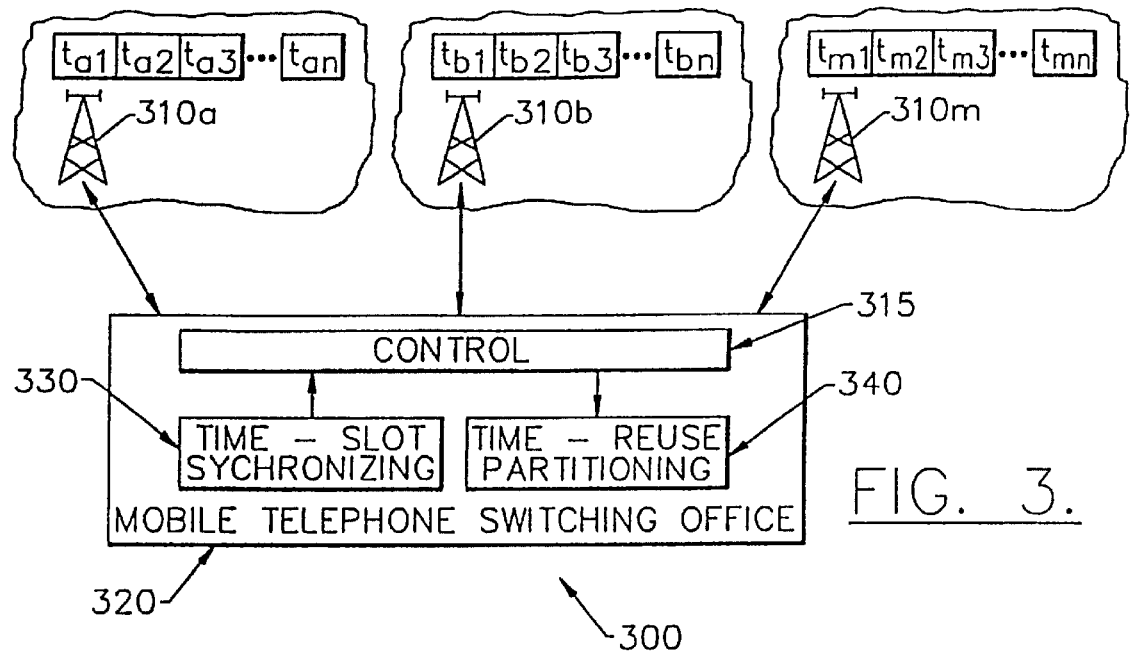
FIG. 3 is a schematic block diagram illustrating synchronized time division multiple access for cellular radiotelephones according to the present invention.

FIG. 3 illustrates a time division multiple access cellular radiotelephone system 300, including base stations 310$a$–$m$ and a mobile telephone switching office 320. The typical base station 310$a$ communicates with cellular radiotelephones using a plurality of sequential time slots $t_{a1}$–$t_{an}$. It will be understood by those skilled in the art that without synchronization, the time slots $t_{a1}$–$t_{an}$ for the base station 310$a$ typically do not coincide with time slots for the other base stations 310$b$–$m$. For the embodiment illustrated, the MTSO 320 includes a control block 315 which performs typical functions of the MTSO 320, such as coordinating the operations of the base stations 310$a$–$m$ and interfacing the cellular system with a public switched telephone network (PSTN).

Figure 4:
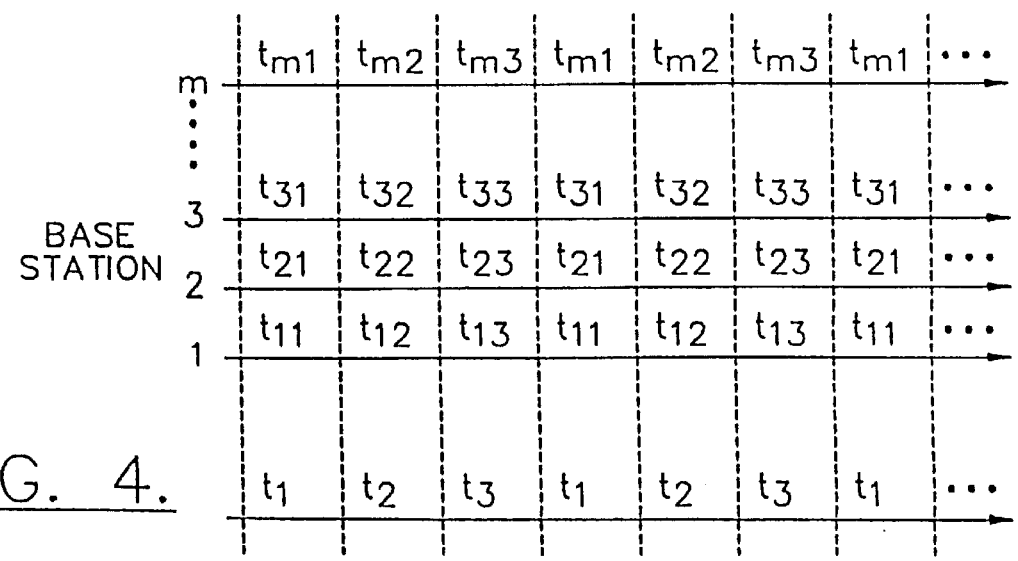
FIG. 4 is a timing diagram illustrating synchronization of base stations in a time division multiple access cellular radiotelephone system according to the present invention.

The MTSO also includes time-slot synchronizing means 330 which aligns corresponding time slots of the base stations 310$a$–$m$. For a given pair of base stations 310$a$ and 310$m$, the time slots $t_{a1}$–$t_{an}$ and $t_{m1}$–$t_{mn}$ to are synchronized such that a first corresponding pair of time slots $t_{a1}$–$t_{m1}$ are approximately concurrent, a second corresponding pair of time slots $t_{a2}$–$t_{m2}$ are approximately concurrent, and, in general, any corresponding pair of time slots $t_{ak}$–$t_{mk}$ are approximately concurrent. In effect, the base stations 310$a$–$m$ are synchronized to produce a synchronized time slot sequence $T_1$–$T_n$, as shown in the idealized illustration of time-slot synchronization for a three-time-slot sequence provided in FIG. 4. It will be understood by those skilled in the art that time slots may be synchronized using various techniques, including those which align internal base station timing signals to a global timing reference signal from a central source or combination of sources, such as satellites used in the Global Positioning System (GPS). It will be also understood that time-slot synchronizing means 330 may employ other time-alignment techniques, such as aligning base station time references using signals transmitted between the base stations.

Figure 5A:
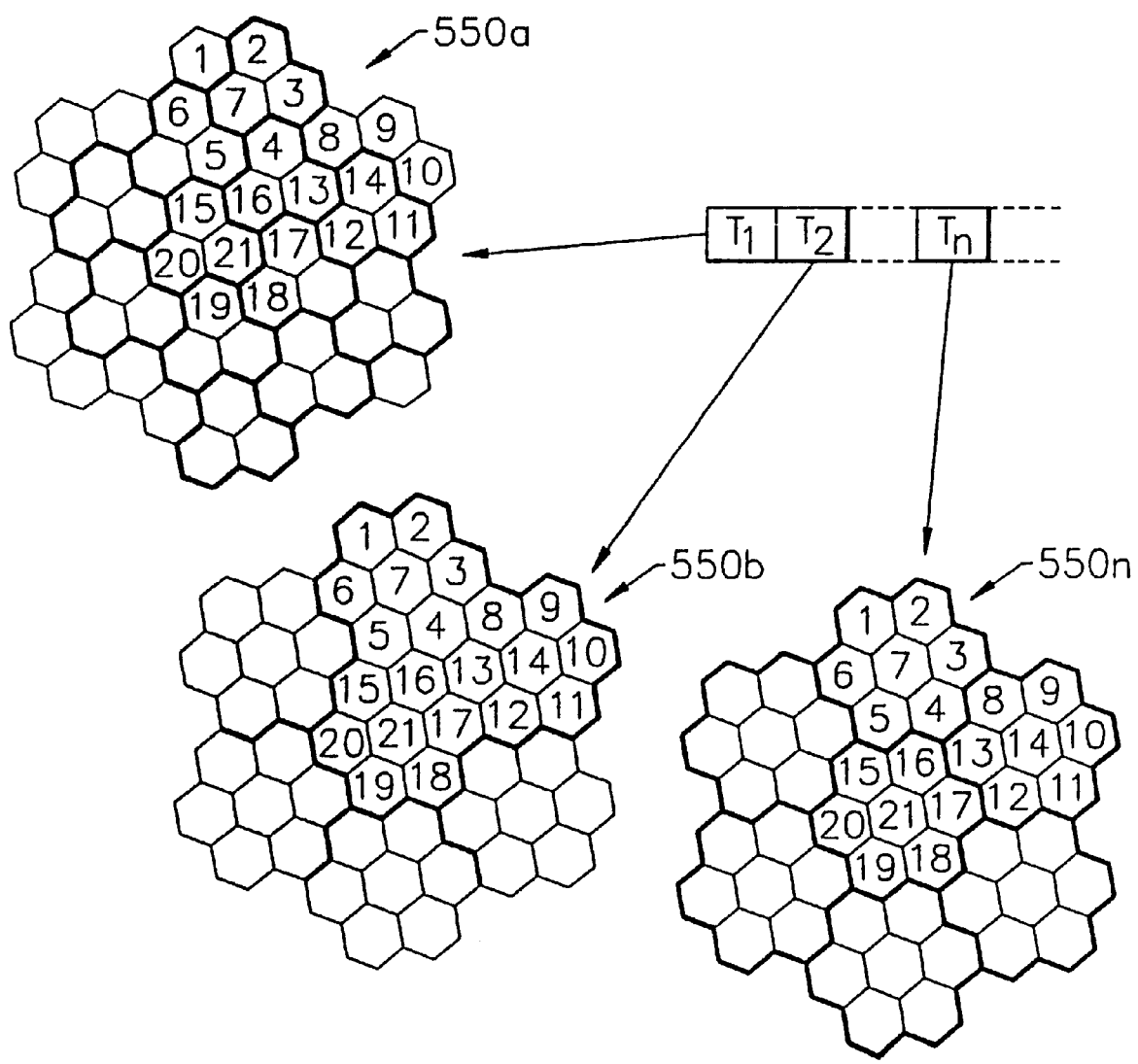
FIG. 5A is a plan view illustrating time-reuse partitioning of frequencies among cells of a cellular radiotelephone system according to the present invention.

FIGS. 5A and 5B illustrate the allocation of a plurality of cellular radiotelephone frequencies among a plurality of cells of a cellular radiotelephone system 300 served by time-division multiple access cellular base stations synchronized to the synchronized time slot sequence $T_1$–$T_n$. In the illustrated embodiment, time-reuse partitioning means 340 allocates cellular radiotelephone frequencies in frequency bands $f_1$–$f_{21}$ among cells according to a different frequency allocation system 550a–n in different time slots of a synchronized time slot sequence $T_1$–$T_n$. In the illustrated embodiment, a 3-cell reuse pattern is used in one time slot $T_1$, a 21-cell reuse pattern is used in a second time slot $T_2$, and a 7-cell reuse pattern is employed in a third time slot $T_n$.

Frequencies preferably are allocated so that communications of one base station minimally interfere with communications of the other base stations. Frequency allocation systems may include frequency reuse plans which repeat frequencies over a geographical area, whether fixed or otherwise. Generally, frequency allocation systems may include fixed frequency reuse plans such as illustrated in FIGS. 5A and 5B, the 21-cell fixed reuse plan conventionally used under the United States AMPS standard, the fixed seven- or nine-cell reuse plans commonly used under the European GSM standard, and the like.

Other frequency reuse systems may also be used with the present invention, such as allocating different frequency reuse pools to different time slots. For example, a first frequency reuse pool allocated to a first time slot may include all frequencies available in the system, for services such as a packet data service having cochannel interference cancellation capability, as described in U.S. patent application Ser. No. 08/179,953 to Dent, filed Jan. 11, 1994, or a wideband service such as a CDMA service, which may use a group of wide frequency bands or single wide frequency band corresponding with the entire spectrum available to the system. A second, more limited reuse pool including a limited number of narrow frequency bands may be allocated to a second time slot assigned to for, for example, a narrowband service such as a digital voice service. The narrow frequency bands allocated to a base station in a given time slot may include only those frequencies unused in adjacent cells in that time slot, thus reducing cochannel interference.

Frequencies may also be allocated responsive to the type of service requested by a radiotelephone. The cellular radiotelephone system may include means for receiving a service request from a radiotelephone. In response to a received request for a first service type, the time reuse partitioning means may assign the radiotelephone to a time slot having a first frequency reuse pool appropriate to that service type, while a request for a second service type will result in assignment of the radiotelephone to a second time slot have a second frequency reuse pool appropriate to the second service type. The service types may include digital voice services, digital data services, packet data services, control message services, facsimile services, image services and CDMA services, among others.

It will be understood by those skilled in the art that frequency allocation systems other than frequency reuse systems may be used with the present invention. For example, adaptive channel allocation systems which adapt the allocation of frequencies to dynamic changes in parameters of the cellular radiotelephone system may be employed in some of the time slots. Examples of channel allocation systems are described in Swedish Patent Application No. 9301695-4 to Wallestedt, filed May 17, 1993, and in U.S. Pat. No. 5,404,574 to Benveniste.

Figure 6A:
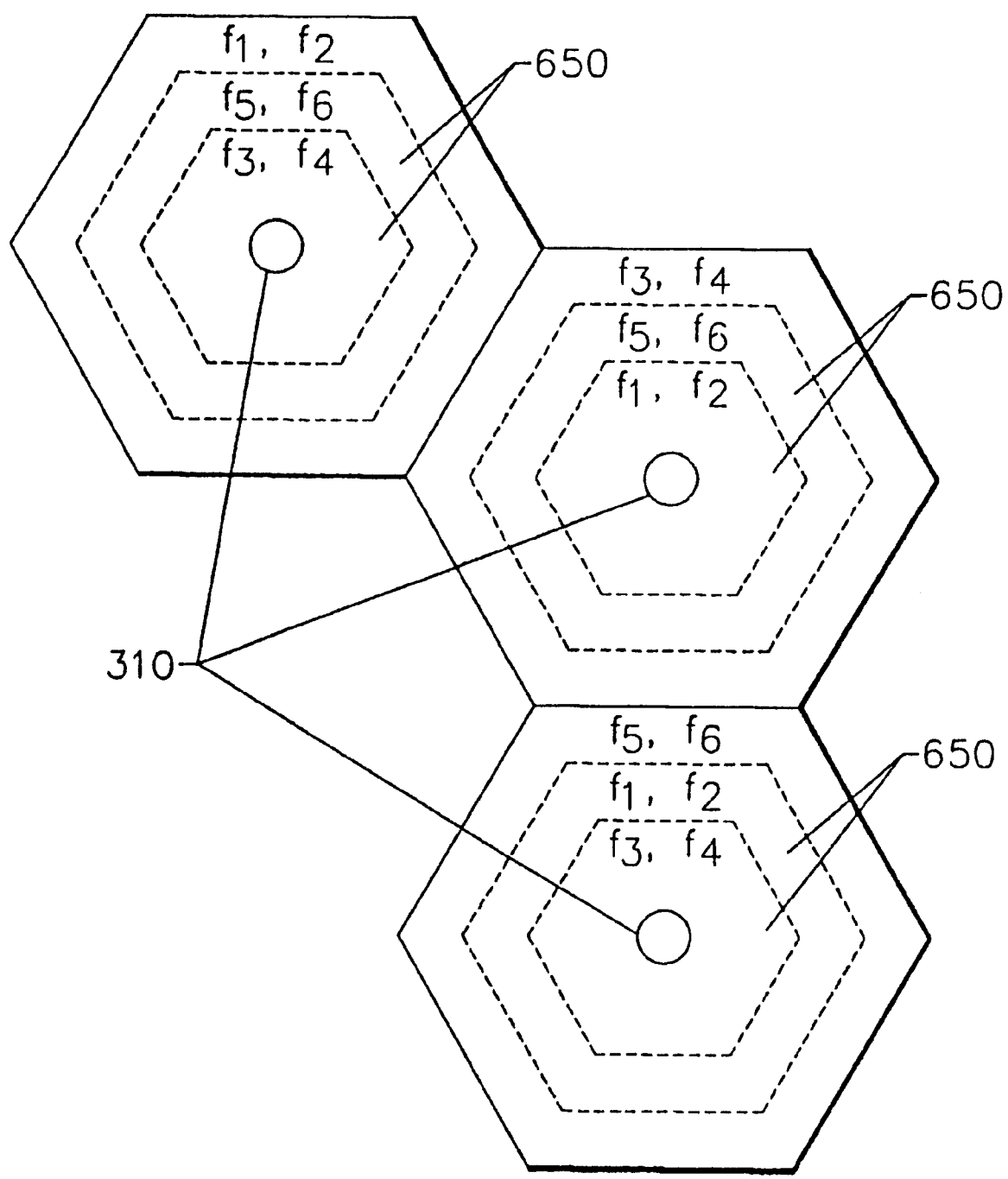
FIGS. 6A–B are plan views illustrating time-reuse partitioning of cellular radiotelephone frequencies and signal ranges in a time division multiple access cellular radiotelephone system according to the present invention.
Figure 6B:
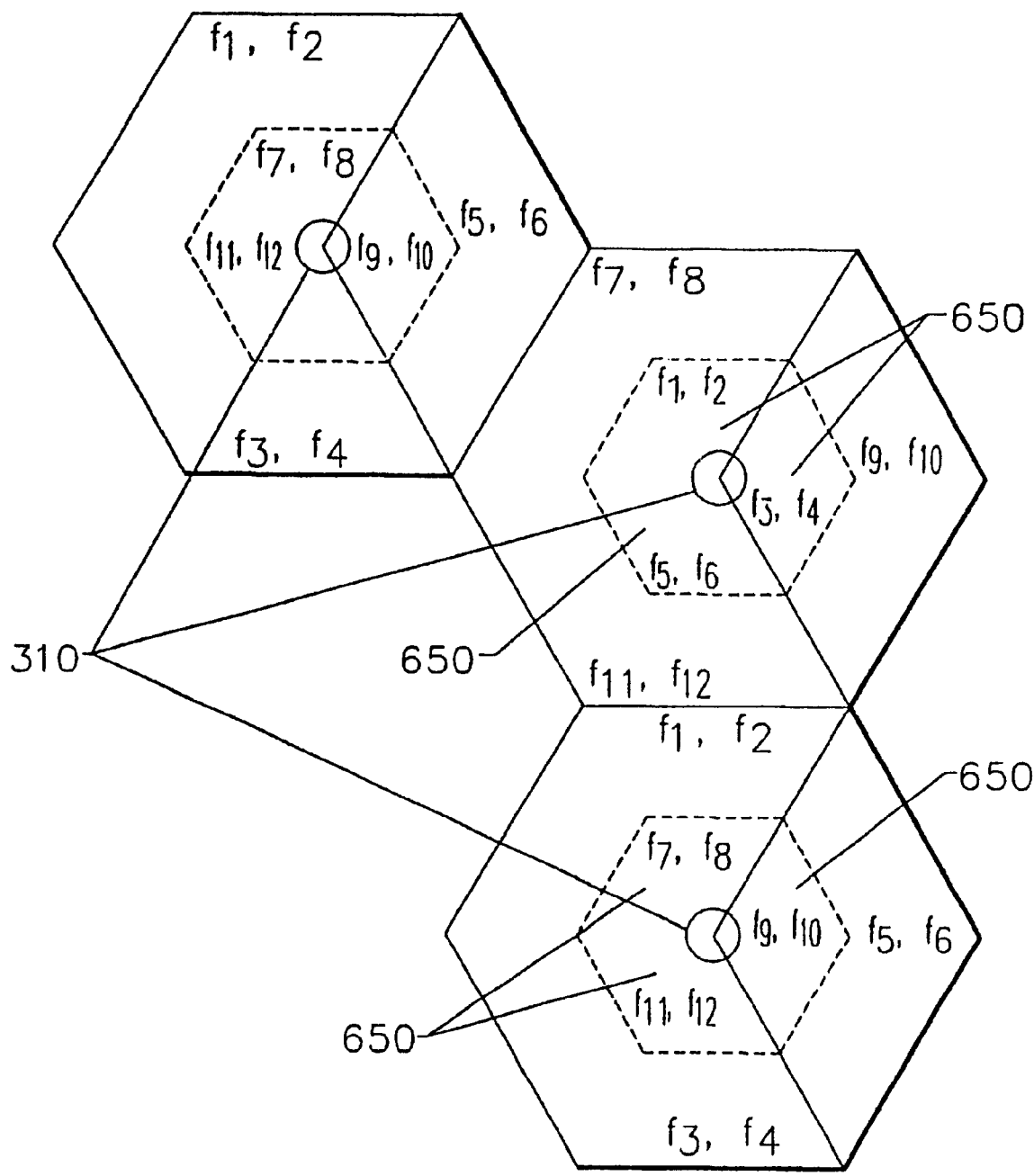

The frequency allocation system 340 may include a frequency reuse partitioning system which allocates frequencies according to signal propagation range. Preferably, frequencies are allocated such that communications at a base station at a particular frequency do not interfere with communications occurring at the same frequency at neighboring base stations. The signal propagation ranges may be controlled by such techniques as varying the transmit power, antenna directivity and receiver gain of each base station so as to control the effective coverage area of the base station for a particular frequency, in effect creating a set of reduced-coverage subcells 650 for those frequencies, as shown in FIGS. 6A and 6B. It will be understood by those skilled in the art that the frequencies corresponding to the subcells 650 may be reused on a tighter pattern because of a lesser degree of coverage overlap, thus providing additional local channel capacity. For cells with centrally-located base stations with omni-directional antennas, the subcells 650 may be nested around base stations 310, as shown in FIG. 6A. For cells covered by sectorized base stations, the subcells 650 may form layers emanating from the base station 310, as shown in FIG. 6B. Examples of frequency-reuse partitioning systems are described in U.S. Pat. No. 5,437,056 to Rautiola and U.S. Pat. No. 5,430,761 to Bruckert et al.

Time-reuse partitioning also allows for the migration of a cellular radiotelephone system from an existing equipment configuration to a new equipment configuration. For example, a fixed reuse plan may be employed in one time slot for existing users having conventional equipment in order to preserve communications quality for these users. New subscribers may, however, have more advanced equipment which allows, for example, tighter frequency reuse or adaptive channel allocation. These new subscribers may be assigned to a another time slot for which a different frequency allocation system, perhaps including frequency bands of different widths, may be employed. As subscribers convert to advanced equipment, more time slots may be allocated to frequency allocation systems suited to that equipment while decreasing the number of time slots dedicated to servicing older equipment. For example, a first time slot may employ a 21-cell reuse pattern for subscribers equipped with conventional D-AMPS phones conforming to IS56, while a second, 9-cell reuse pattern may be used in another time slot for users equipped with a more advanced phone employing diversity reception to reduce interference.

It will be understood by those skilled in the art that time-slot synchronizing means 330 and time-reuse partitioning means 340 may be implemented in the mobile telephone switching office 320, at the base stations 310a–n, in feature nodes, client servers or other elements of the cellular radiotelephone system 300, or in combinations thereof. The implementation of time-slot synchronizing means 330 and time-reuse partitioning means 340 may be distributed around cellular radiotelephone system 300 or centralized. Time-slot synchronizing means 330 and time-reuse partitioning means 340 may also be implemented using dedicated hardware, general purpose hardware plus software or combinations thereof.

A base station 310 may also include first processing means responsive to a first type of radiotelephone communications signals communicated during a first group of sequential time slots, for processing the first type of radiotelephone communications signals to thereby recover radiotelephone communications and second processing means responsive to a second type of radiotelephone communications signals different from the first type of radiotelephone communications signals, communicated during a second group of time slots, for processing the second type of radiotelephone communications signals to thereby recover radiotelephone communications. For example, the first processing means may include means for processing narrowband radiotelephone communications signals such as digital voice radiotelephone communications signals, and the second processing means may include means for processing wideband communications signals, such as means for processing packet data and CDMA radiotelephone communications signals. In addition, means for processing packet data radiotelephone communications signals may include means for canceling interference.

The first and second processing means may also include receiving means, responsive to radiotelephones, for receiving radiotelephone communications signals from a radiotelephone over a plurality of signal paths, and means for processing radiotelephone communications signals received by the receiving means. For example, the receiving means may include multiple antennas mounted in a spaced apart manner at the base station 310, to take advantage of spatial diversity. In addition to providing spatial diversity, the means for processing received radiotelephone communications signals may also include first means for combining the received radiotelephone communications signals which are received from a first direction and second means for combining the received radiotelephone communications signals which are received from a second direction to thereby provide directivity in reception.

Those skilled in the art will understand that the first and second processing means may include individual processors, multichannel processors or combinations thereof, and may be implemented using special purpose analog or digital hardware, general purpose processors running software or combinations thereof.

It will be understood by those skilled in the art that gains in channel capacity and spectral efficiency similar to that achieved using time reuse partitioning in a TDMA system may be achieved by reuse partitioning in a CDMA cellular system. When spread-spectrum techniques are used to provide multiple access as in CDMA systems, spreading codes which produce modulating waveforms with good-cross correlation properties are generally desirable to minimize interference between channels. An infinite set of infinite random sequences would be the ideal code set for eliminating interference, but the need to perform finite processing in base stations and cellular radiotelephones makes the use of infinite sequences impracticable. For this reason, pseudo-random periodic sequences, such as maximal-length sequences or Gold codes, are typically employed in spread-spectrum systems. Generally, the size of the set of codes having desired cross-correlation characteristics increases with sequence length. However, long codes may lead to increased acquisition times as the receiving unit must search through potential code phases and frequencies. Thus, memory capacity and acquisition time requirements place a practical limit on code sequence length, the number of useable codes and, ultimately, the number of channels available in the CDMA system.

According to the present invention, a CDMA system may achieve increased capacity by subdividing code-reuse partitioning carrier frequencies among the base stations of the CDMA system according to spreading codes. Code-reuse partitioning of carrier frequencies used in CDMA base stations may increase channel capacity and spectral efficiency by allowing base stations to reuse frequencies for each spreading code.

Figure 7:
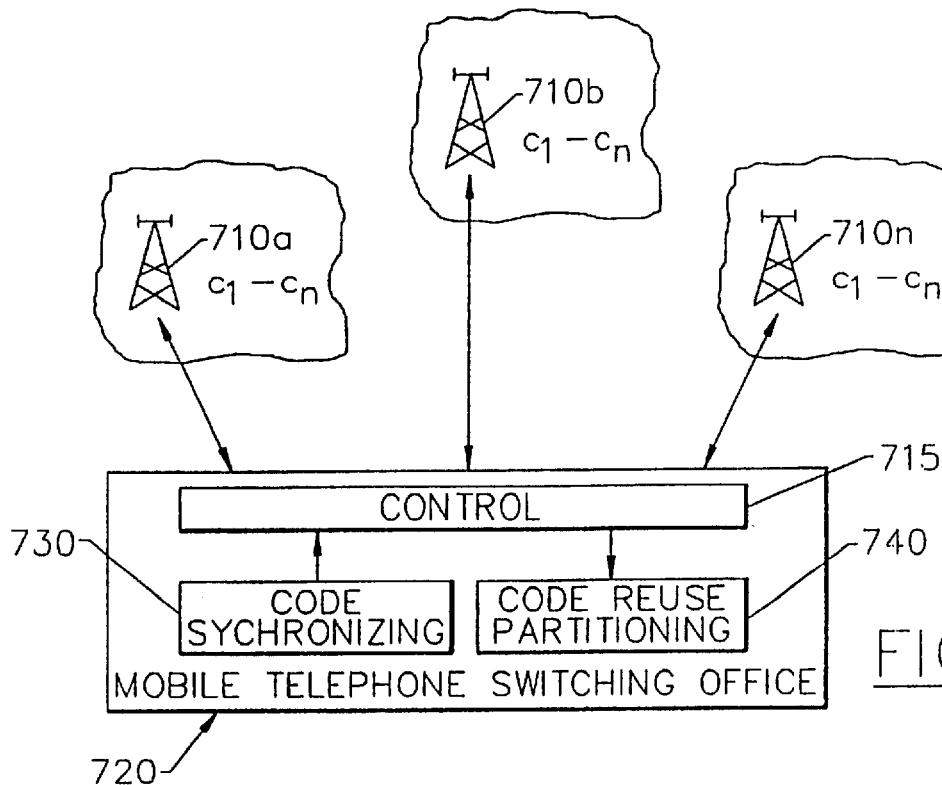
FIG. 7 is a schematic block diagram illustrating synchronized code division multiple access for cellular radiotelephones according to the present invention.
Figure 8A:
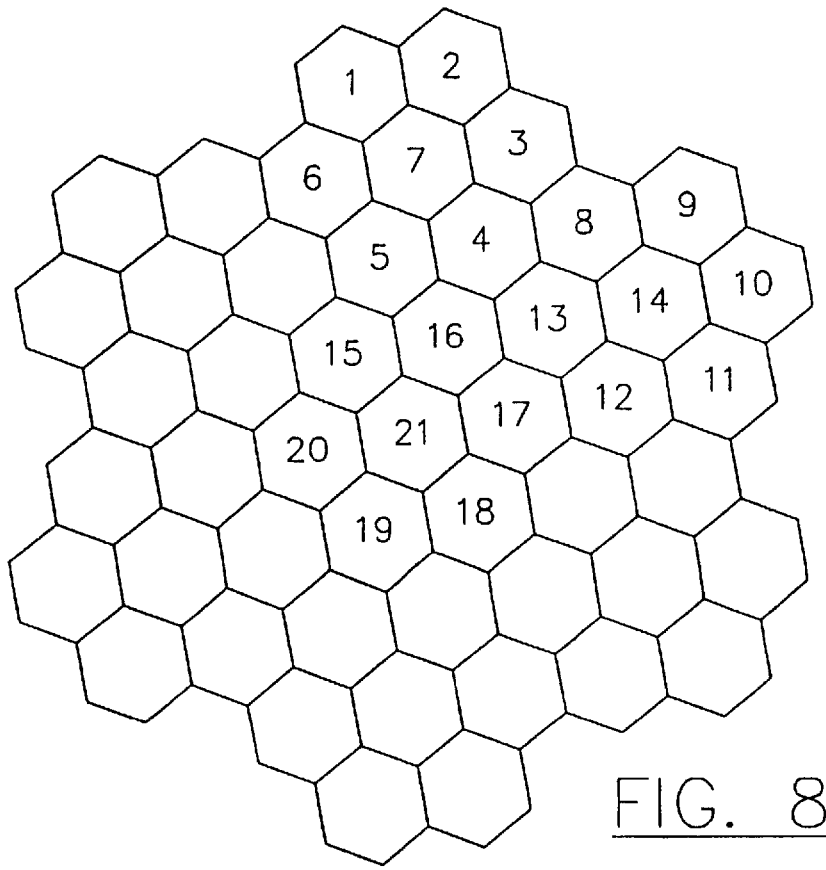
FIG. 8A is a plan view illustrating cells of a code-division multiple access cellular radiotelephone system.

FIG. 7 illustrates code-reuse partitioning for a plurality of synchronized code division multiple access (CDMA) cellular radiotelephone base stations $710a$–$m$. Each base station communicates with cellular radiotelephones using a plurality of spreading codes $C_1$–$C_n$. Code-synchronizing means 730 synchronizes spreading codes $C_1$–$C_n$ so that the periods of each of the codes $C_1$–$C_n$ are concurrent. Code-reuse partitioning means 740 allocates frequencies to base stations $710a$–$m$ according to a frequency allocation system for each spreading code $C_i$. Preferably, the frequencies are allocated such that interference between cells is minimized. FIGS. 8A and 8B illustrate the use of two different frequency allocation systems for a simplified CDMA system employing three codes and 21 frequencies. For the embodiment illustrated, a 7-cell frequency reuse pattern is employed for two spreading codes $C_1$, $C_3$ while a 21-cell reuse pattern is used for a third code $C_2$. It will be understood by those skilled in the art that other combinations of frequency allocations may be used with the present invention. The frequency allocation system for each code may be a fixed frequency reuse system or other frequency reuse system, an adaptive channel allocation system, or a frequency reuse partitioning system which controls frequency assignment based on distance from a base station.

It will be understood by those skilled in the art that code-reuse partitioning provides for migration of a CDMA system much as time-reuse partitioning does for TDMA systems. For example, existing subscribers may be assigned to a particular subset of codes employed by the system, and a particular frequency reuse pattern applied to this subset. New subscribers with more advanced equipment may be assigned to other codes for which tighter frequency reuse patterns are applied. As the subscriber population converts to more advanced equipment, more spreading codes may be assigned frequency allocation systems compatible with that equipment.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A cellular radiotelephone system comprising:
   a plurality of code division multiple access (CDMA) cellular radiotelephone base stations for communicating with cellular radiotelephones on a plurality of frequencies using a plurality of spreading codes, each of said plurality of spreading codes having a period;
   code synchronizing means for synchronizing said plurality of spreading codes among said plurality of base stations so that said periods of each of said plurality of spreading codes are concurrent, to produce synchronized spreading codes among said plurality of base stations; and
   code-reuse partitioning means for allocating cellular radiotelephone frequencies among said plurality of base stations for a first one of said synchronized spreading codes according to a first frequency allocation system and for allocating frequencies among said plurality of base stations for a second one of said synchronized spreading codes according to a second frequency allocation system different from said first frequency allocation system.

2. A cellular radiotelephone system according to claim 1 wherein said plurality of spreading codes is one of a plurality of direct-sequence-modulation codes, a plurality of frequency-hopping codes, and a plurality of combined frequency-hopping/direct-sequence-modulation codes.

3. A system according to claim 1 wherein said first frequency allocation system is one of a first adaptive channel allocation system, a first frequency reuse system, a first frequency reuse partitioning system and a first fixed frequency reuse system, and wherein said second frequency allocation system is one of a second adaptive channel allocation system, a second frequency reuse system, a second frequency reuse partitioning system and a second fixed frequency reuse system.

4. A system according to claim 1:
   wherein said first frequency allocation has a number of subscribers; and
   wherein said code-reuse partitioning means further comprises means responsive to said number of subscribers of said first frequency allocation system for allocating cellular radiotelephone frequencies among said plurality of base stations according to said first frequency allocation system for a third one of said synchronized spreading codes.

5. A method of operating a plurality of code division multiple access cellular radiotelephone base stations for communicating with cellular radiotelephones using a plurality of synchronized spreading codes, each of said spreading codes having a period, the method comprising:
   allocating cellular radiotelephone frequencies among said plurality of base stations according to one of a first adaptive channel allocation system, a first frequency reuse system, a first frequency reuse partitioning system and a first fixed frequency reuse system for a first one of said synchronized spreading codes and according to one of a second adaptive channel allocation system, a second frequency reuse system, a second frequency reuse partitioning system and a second fixed frequency reuse system for a second one of said synchronized spreading codes.

6. A method of operating a plurality of code division multiple access cellular radiotelephone base stations, the method comprising the steps of:
   communicating between the plurality of base stations and radiotelephones using a common plurality of spreading codes;
   synchronizing said plurality of spreading codes among said plurality of base stations so that said periods of said plurality of spreading codes are concurrent, to produce synchronized spreading codes among said plurality of base stations; and
   allocating cellular radiotelephone frequencies among said plurality of base stations according to a first frequency allocation system for a first one of said synchronized spreading codes and according to a second frequency allocation system different from said first frequency allocation system for a second one of said synchronized spreading codes,
   wherein said step of allocating comprises allocating cellular radiotelephone frequencies among said plurality of base stations according to one of a first adaptive channel allocation system, a first frequency reuse system, a first frequency reuse partitioning system and a first fixed frequency reuse system for said first one of said synchronized spreading codes and according to one of a one of a second adaptive channel allocation system, a second frequency reuse system, a second frequency reuse partitioning system and a second fixed frequency reuse system for said second one of said synchronized spreading codes.

7. A cellular radiotelephone system comprising:
   a plurality of code division multiple access (CDMA) cellular radiotelephone base stations that communicate with cellular radiotelephones on a plurality of frequencies using a common plurality of spreading codes and using frequencies that are allocated among said plurality of base stations such that frequencies are allocated for a first one of said spreading codes according to a first frequency allocation system and are allocated for a second one of said spreading codes according to a second frequency allocation system different from said first frequency allocation system,
   wherein said first frequency allocation system is one of a first adaptive channel allocation system, a first frequency reuse system, a first frequency reuse partitioning system and a first fixed frequency reuse system, and wherein said second frequency allocation system is one of a second adaptive channel allocation system, a second frequency reuse system, a second frequency reuse partitioning system and a second fixed frequency reuse system.

* * * * *